Patented Apr. 29, 1930

1,756,762

UNITED STATES PATENT OFFICE

CHARLES T. RILEY, OF ROSICLARE, ILLINOIS, ASSIGNOR OF ONE-FOURTH TO J. COY LAY, ONE-FOURTH TO E. CALVIN CLARK, AND ONE-FOURTH TO ARTHUR H. CRONK, ALL OF ROSICLARE, ILLINOIS

COMPOSITION

No Drawing.    Application filed August 3, 1928.  Serial No. 297,371.

This invention relates to a cement composition especially adapted for use in places exposed to the action of intense heat, and has for an object the provision of a plastic composition for surfacing the interior walls and arches of fire boxes, and for cementing fire brick.

To this end the invention provides a plastic composition having high fire resisting and bonding qualities, and which will produce a high temper in fire brick or tile which are exposed to heat.

The composition consists of finely ground or powdered salt, Portland cement, fire clay, calc-spar, and fluorspar.

In preparing the composition, the ingredients above mentioned are used in about the following proportions—viz.:

| | Per cent |
|---|---|
| Salt | 10 |
| Portland cement | 15 |
| Fire clay | 30 |
| Calc-spar | 35 |
| Fluorspar | 10 |

These ingredients are thoroughly mixed dry and a sufficient quantity of water added to form a paste or mortar of such consistency as to enable it to be plastered over a surface to be protected, or used as a bond or binder.

While the above mentioned proportions are generally used, they may vary slightly without materially affecting the quality of the composition.

Having described the invention what is claimed is:

1. A composition consisting of a mixture of finely ground salt, cement, fire clay, calc-spar, and fluorspar thoroughly mixed together.

2. A composition consisting of ten percent salt, fifteen percent Portland cement, thirty percent fire clay, thirty-five percent calc-spar, and ten percent fluorspar, all finely ground and thoroughly mixed.

In testimony whereof I affix my signature.

CHARLES T. RILEY.